(12) United States Patent
Schaug-Pettersen

(10) Patent No.: US 8,188,748 B2
(45) Date of Patent: May 29, 2012

(54) ELECTROMAGNETIC SURVEYING

(75) Inventor: Tor Schaug-Pettersen, Trondheim (NO)

(73) Assignee: Electromagnetic Geoservices AS, Trondheim (NO)

(*) Notice: Subject to any disclaimer, the term of this patent is extended or adjusted under 35 U.S.C. 154(b) by 325 days.

(21) Appl. No.: 12/278,933

(22) PCT Filed: Feb. 9, 2007

(86) PCT No.: PCT/GB2007/000459
§ 371 (c)(1),
(2), (4) Date: Dec. 18, 2008

(87) PCT Pub. No.: WO2007/091086
PCT Pub. Date: Aug. 16, 2007

(65) Prior Publication Data
US 2010/0052688 A1    Mar. 4, 2010

(30) Foreign Application Priority Data
Feb. 9, 2006    (GB) .................................. 0602656.1

(51) Int. Cl.
*G01V 3/00* (2006.01)
(52) U.S. Cl. ...................................................... 324/334
(58) Field of Classification Search ........................ None
See application file for complete search history.

(56) References Cited

U.S. PATENT DOCUMENTS

| | | | |
|---|---|---|---|
| 1,818,331 A | 8/1931 | Jakosky | |
| 2,077,707 A | 4/1937 | Melton | |
| 2,139,460 A | 12/1938 | Potapenko | |
| 2,268,106 A | 12/1941 | Blau | |
| 2,426,918 A | 9/1947 | Barret | |
| 2,531,088 A | 11/1950 | Thompson | |
| 2,766,422 A | 10/1956 | Carbonetto | |
| 2,907,389 A | 10/1959 | Hitzman | |
| 2,919,397 A | 12/1959 | Morley | |
| 2,953,742 A | 9/1960 | Herbold | |
| 3,052,836 A | 9/1962 | Postma | |
| 3,105,014 A | 9/1963 | Harrison | |
| 3,113,316 A | 12/1963 | Berry | |
| 3,114,875 A | 12/1963 | Haagensen | |
| 3,182,250 A | 5/1965 | Conti et al. | |
| 3,332,487 A | 7/1967 | Jones | |

(Continued)

FOREIGN PATENT DOCUMENTS
EP    0 087 271    8/1983
(Continued)

OTHER PUBLICATIONS

Ellingsrud et al., "*How Electromagnetic Sounding Technique Could be Coming to Hydrocarbon E & P*", 20 First Break (Mar. 2002).

(Continued)

*Primary Examiner* — Jermele M Hollington
(74) *Attorney, Agent, or Firm* — Patterson Thuente Christensen Pedersen, P.A.

(57) ABSTRACT

A method of determining the nature of subterranean strata. The transmitter antenna is towed by vessel at a distance h above the sea floor. The antenna omits a wave field whose strength is proportional to the current delivered to the antenna and this is monitored. The input voltage to the antenna is also measured and changes in antenna impedance are calculated. Changes in antenna impedance are used together with seismic information to determine the nature of the subsea strata.

14 Claims, 1 Drawing Sheet

U.S. PATENT DOCUMENTS

| | | |
|---|---|---|
| 3,398,356 A | 8/1968 | Still |
| 3,548,299 A | 12/1970 | Duroux et al. |
| 3,763,419 A | 10/1973 | Barringer |
| 3,806,795 A | 4/1974 | Morey |
| 3,819,246 A | 6/1974 | List |
| 3,836,960 A | 9/1974 | Gehman et al. |
| 3,959,721 A | 5/1976 | Roschuk et al. |
| 4,010,413 A | 3/1977 | Daniel |
| 4,041,372 A | 8/1977 | Miller et al. |
| 4,047,098 A | 9/1977 | Duroux |
| 4,077,686 A | 3/1978 | Bukaitz |
| 4,079,309 A | 3/1978 | Seeley |
| 4,094,304 A | 6/1978 | Wright, Jr. |
| 4,168,484 A | 9/1979 | Wright, Jr. |
| 4,218,678 A | 8/1980 | Fowler et al. |
| 4,229,809 A | 10/1980 | Schwalbe |
| 4,245,191 A | 1/1981 | Schroeder |
| 4,258,321 A | 3/1981 | Neale, Jr. |
| 4,258,322 A | 3/1981 | Rocroi et al. |
| 4,283,099 A | 8/1981 | Burton |
| 4,296,379 A | 10/1981 | Yoshizumi |
| 4,298,840 A | 11/1981 | Bischoff et al. |
| 4,308,499 A | 12/1981 | Thierbach et al. |
| 4,396,885 A | 8/1983 | Constant |
| 4,417,210 A | 11/1983 | Rocroi et al. |
| 4,446,434 A | 5/1984 | Sternberg et al. |
| 4,451,789 A | 5/1984 | Meador |
| 4,456,067 A | 6/1984 | Pinner |
| 4,489,276 A | 12/1984 | Yu |
| 4,492,924 A | 1/1985 | Nilsson |
| 4,494,805 A | 1/1985 | Washburn |
| 4,500,146 A | 2/1985 | Peterson |
| 4,504,833 A | 3/1985 | Fowler et al. |
| 4,506,225 A | 3/1985 | Loveless et al. |
| 4,516,226 A | 5/1985 | Peynaud et al. |
| 4,547,733 A | 10/1985 | Thoraval |
| 4,583,095 A | 4/1986 | Peterson |
| 4,594,551 A | 6/1986 | Cox et al. |
| 4,616,184 A | 10/1986 | Lee et al. |
| 4,617,518 A | 10/1986 | Srnka |
| 4,633,182 A | 12/1986 | Dzwinel |
| 4,652,829 A | 3/1987 | Safinya |
| 4,660,645 A | 4/1987 | Newlove |
| 4,677,438 A | 6/1987 | Michiguchi et al. |
| 4,698,791 A | 10/1987 | Cunningham |
| 4,760,340 A | 7/1988 | Denzau et al. |
| 4,791,998 A | 12/1988 | Hempkins et al. |
| 4,793,664 A | 12/1988 | Jackson |
| 4,835,473 A | 5/1989 | Bostick, Jr. |
| 4,835,474 A | 5/1989 | Parra et al. |
| 4,906,575 A | 3/1990 | Silver et al. |
| 4,926,394 A | 5/1990 | Doyen |
| 4,957,172 A | 9/1990 | Patton et al. |
| 4,986,354 A | 1/1991 | Cantu |
| 4,992,995 A | 2/1991 | Favret |
| 5,025,218 A | 6/1991 | Ramstedt |
| 5,032,794 A | 7/1991 | Ridd et al. |
| 5,039,179 A | 8/1991 | Chouzenoux |
| 5,043,667 A | 8/1991 | Schofield |
| 5,066,916 A | 11/1991 | Rau |
| 3,990,123 A | 4/1992 | Martinez |
| 5,103,920 A | 4/1992 | Patton et al. |
| 5,170,440 A | 12/1992 | Cox |
| 5,172,480 A | 12/1992 | Labuc et al. |
| 5,177,445 A | 1/1993 | Cross |
| 5,185,578 A | 2/1993 | Stolarczykz |
| 5,192,952 A | 3/1993 | Johler |
| 5,219,386 A | 6/1993 | Kletzmaier et al. |
| 5,280,284 A | 1/1994 | Johler |
| 5,357,253 A | 10/1994 | Van Etten et al. |
| 5,369,892 A | 12/1994 | Dhaemers |
| 5,373,443 A | 12/1994 | Lee et al. |
| 5,400,030 A | 3/1995 | Duren et al. |
| D359,403 S | 6/1995 | Tisbo et al. |
| 5,421,646 A | 6/1995 | McNamara et al. |
| D361,446 S | 8/1995 | Acard |
| 5,444,619 A | 8/1995 | Hoskins |
| H1490 H | 9/1995 | Thompson et al. |
| H1490 H | 9/1995 | Thompson et al. |
| D362,767 S | 10/1995 | Kelly et al. |
| D366,376 S | 1/1996 | Tisbo et al. |
| D366,577 S | 1/1996 | Tisbo et al. |
| 5,486,764 A | 1/1996 | Thompson et al. |
| H1524 H | 4/1996 | Thompson et al. |
| H1561 H | 7/1996 | Thompson |
| 5,563,513 A | 10/1996 | Tasei et al. |
| 5,564,806 A | 10/1996 | Keisling et al. |
| 5,581,024 A | 12/1996 | Meyer, Jr. et al. |
| 5,689,068 A | 11/1997 | Locatelli et al. |
| 5,690,401 A | 11/1997 | Franklin |
| 5,704,142 A | 1/1998 | Stump |
| 5,724,309 A | 3/1998 | Higgs et al. |
| 5,767,679 A | 6/1998 | Schroder |
| 5,770,945 A | 6/1998 | Constable |
| 5,777,478 A | 7/1998 | Jackson |
| 5,798,892 A | 8/1998 | Kobayashi et al. |
| 5,811,973 A | 9/1998 | Meyer, Jr. |
| 5,825,188 A | 10/1998 | Montgomery et al. |
| 5,838,634 A | 11/1998 | Jones |
| 5,841,280 A | 11/1998 | Yu et al. |
| 5,877,995 A | 3/1999 | Thompson et al. |
| 5,886,526 A | 3/1999 | Wu |
| 5,892,361 A | 4/1999 | Meyer, Jr. et al. |
| 5,894,450 A | 4/1999 | Schmidt et al. |
| 5,901,795 A | 5/1999 | Tsao et al. |
| 5,905,380 A | 5/1999 | Weiner et al. |
| 5,905,657 A | 5/1999 | Celniker |
| 5,940,777 A | 8/1999 | Keskes |
| 5,955,884 A | 9/1999 | Payton et al. |
| 5,987,388 A | 11/1999 | Crawford et al. |
| 5,996,414 A | 12/1999 | Mercado |
| 6,002,357 A | 12/1999 | Redfern et al. |
| 6,005,916 A | 12/1999 | Johnson et al. |
| 6,011,557 A | 1/2000 | Keskes et al. |
| 6,023,168 A | 2/2000 | Minerbo |
| 6,026,913 A | 2/2000 | Mandal et al. |
| 6,041,018 A | 3/2000 | Roche |
| 6,049,760 A | 4/2000 | Scott |
| 6,060,884 A | 5/2000 | Meyer, Jr. et al. |
| 6,060,885 A | 5/2000 | Tabarovsky et al. |
| 6,061,412 A | 5/2000 | Stucker et al. |
| 6,087,833 A | 7/2000 | Jackson |
| 6,101,448 A | 8/2000 | Ikelle et al. |
| 6,108,605 A | 8/2000 | Doyle et al. |
| 6,114,972 A | 9/2000 | Smith |
| 6,140,819 A | 10/2000 | Peterman et al. |
| 6,157,195 A | 12/2000 | Vail, III |
| 6,163,155 A | 12/2000 | Bittar |
| 6,181,138 B1 | 1/2001 | Hagiwara et al. |
| 6,184,685 B1 | 2/2001 | Paulk et al. |
| 6,188,221 B1 | 2/2001 | Van de Kop et al. |
| 6,188,222 B1 | 2/2001 | Seydoux et al. |
| 6,225,806 B1 | 5/2001 | Millar et al. |
| 6,236,211 B1 | 5/2001 | Wynn |
| 6,236,212 B1 | 5/2001 | Wynn |
| 6,246,240 B1 | 6/2001 | Vail, III |
| 6,294,917 B1 | 9/2001 | Nichols |
| 6,339,333 B1 | 1/2002 | Kuo |
| 6,389,360 B1 | 5/2002 | Alft et al. |
| 6,415,231 B1 | 7/2002 | Hebert |
| 6,424,918 B1 | 7/2002 | Jorgensen et al. |
| 6,450,599 B1 | 9/2002 | Mamuyac |
| 6,480,000 B1 | 11/2002 | Kong et al. |
| 6,499,817 B2 | 12/2002 | Jermain |
| 6,573,855 B1 | 6/2003 | Hayakawa et al. |
| 6,628,119 B1 | 9/2003 | Eidesmo et al. |
| 6,662,147 B1 | 12/2003 | Fournier et al. |
| 6,696,839 B2 | 2/2004 | Ellingsrud et al. |
| 6,700,526 B2 | 3/2004 | Witten |
| 6,717,411 B2 | 4/2004 | Ellingsrud et al. |
| 6,826,483 B1 | 11/2004 | Anderson et al. |
| 6,834,732 B2 | 12/2004 | Haarstad |
| 6,842,006 B2 | 1/2005 | Conti et al. |
| 6,859,038 B2 | 2/2005 | Ellingsrud et al. |
| 6,864,684 B2 | 3/2005 | Ellingsrud et al. |
| 6,900,639 B2 | 5/2005 | Ellingsrud et al. |
| 6,917,564 B2 | 7/2005 | Leaney |

| | | | | | | |
|---|---|---|---|---|---|---|
| 6,950,786 | B1 | 9/2005 | Sonneland et al. | GB | 1588495 | 4/1981 |
| 6,950,790 | B1 | 9/2005 | Nichols | GB | 2089043 | 6/1982 |
| 7,026,819 | B2 | 4/2006 | Eidesmo et al. | GB | 2 155 182 | 11/1984 |
| 7,028,806 | B2 | 4/2006 | Dubinsky et al. | GB | 2 155 182 | 9/1985 |
| 7,032,707 | B2 | 4/2006 | Egerev et al. | GB | 2197078 | 5/1988 |
| 7,038,456 | B2 * | 5/2006 | Ellingsrud et al. ............ 324/334 | GB | 2197952 | 6/1988 |
| 7,038,850 | B2 | 5/2006 | Chang et al. | GB | 220070 | 12/1989 |
| 7,042,802 | B2 | 5/2006 | Sinha | GB | 2220071 | 12/1989 |
| 7,072,767 | B2 | 7/2006 | Routh et al. | GB | 2 231 602 | 11/1990 |
| 7,095,357 | B1 | 8/2006 | Johler | GB | 2 256 715 | 12/1992 |
| 7,106,065 | B1 | 9/2006 | Graf | GB | 2296567 | 7/1996 |
| 7,123,543 | B2 | 10/2006 | Vaage et al. | GB | 2 301 902 | 12/1996 |
| 7,126,338 | B2 | 10/2006 | MacGregor et al. | GB | 2323443 | 9/1998 |
| 7,145,341 | B2 | 12/2006 | Ellingsrud et al. | GB | 2333364 | 7/1999 |
| 7,149,672 | B2 | 12/2006 | Torkildsen | GB | 2 355 538 | 4/2001 |
| 7,202,669 | B2 | 4/2007 | Ellingsrud et al. | GB | 2382875 | 7/2001 |
| 7,319,330 | B2 | 1/2008 | Amundsen | GB | 2 34 390 | 1/2002 |
| 7,423,432 | B2 | 9/2008 | Amundsen | GB | 2384068 | 7/2003 |
| 7,471,089 | B2 | 12/2008 | Zerilli et al. | GB | 2385923 | 9/2003 |
| 7,613,570 | B2 | 11/2009 | Rosten et al. | GB | 2390904 | 1/2004 |
| 7,664,603 | B2 | 2/2010 | Rosten | GB | 2391946 | 2/2004 |
| 7,919,965 | B2 | 4/2011 | Schaug-Pettersen et al. | GB | 2395563 | 5/2004 |
| 8,086,426 | B2 | 12/2011 | El Ouair et al. | GB | 2399640 | 9/2004 |
| 2003/0048105 | A1 | 3/2003 | Ellingsrud et al. | GB | 2404444 | 2/2005 |
| 2003/0050759 | A1 | 3/2003 | Srnka et al. | GB | 2411006 | 8/2005 |
| 2003/0052685 | A1 | 3/2003 | Ellingsrud et al. | GB | 2413187 | 10/2005 |
| 2004/0000912 | A1 | 1/2004 | Conti et al. | GB | 2413188 | 10/2005 |
| 2004/0003511 | A1 | 1/2004 | Silver | GB | 2415511 | 12/2005 |
| 2004/0017137 | A1 | 1/2004 | Straub | GB | 2421800 | 7/2006 |
| 2004/0027103 | A1 | 2/2004 | Boylan | JP | 2002 244580 | 8/2002 |
| 2004/0046568 | A1 | 3/2004 | Unsworth et al. | JP | 2006145360 | 6/2006 |
| 2004/0090234 | A1 | 5/2004 | Macune | WO | WO 81/01617 | 6/1981 |
| 2004/0176910 | A1 | 9/2004 | Ellingsrud et al. | WO | WO 89/10463 | 11/1989 |
| 2005/0035696 | A1 | 2/2005 | Parise et al. | WO | WO-90/00749 | 1/1990 |
| 2005/0040742 | A1 | 2/2005 | Tsai | WO | WO 92/13172 | 8/1992 |
| 2005/0264294 | A1 | 12/2005 | Constable | WO | WO 92/15771 | 9/1992 |
| 2006/0005965 | A1 | 1/2006 | Chouzenoux et al. | WO | WO-92/15900 | 9/1992 |
| 2006/0038570 | A1 | 2/2006 | Constable | WO | WO 94/20864 | 9/1994 |
| 2006/0091889 | A1 * | 5/2006 | Ellingsrud et al. ............ 324/334 | WO | WO 96/06367 | 2/1996 |
| 2006/0103387 | A1 | 5/2006 | Amundsen | WO | WO 96/33426 | 10/1996 |
| 2006/0202697 | A1 | 9/2006 | Sodal | WO | WO 96/35859 | 11/1996 |
| 2007/0145980 | A1 | 6/2007 | Conti et al. | WO | WO 97/33184 | 9/1997 |
| 2007/0150201 | A1 | 6/2007 | Eidesmo et al. | WO | WO 98/11455 | 3/1998 |
| 2007/0294036 | A1 | 12/2007 | Strack et al. | WO | WO 98/28638 | 7/1998 |
| 2008/0065330 | A1 | 3/2008 | Rosten et al. | WO | WO 99/13966 | 3/1999 |
| 2008/0122444 | A1 | 5/2008 | Schaug-Pettersen et al. | WO | WO 00/00850 | 1/2000 |
| 2008/0169817 | A1 | 7/2008 | Morrison et al. | WO | WO 00/13037 | 3/2000 |
| 2008/0189043 | A1 | 8/2008 | Anno et al. | WO | WO 00/13046 | 3/2000 |
| 2008/0195358 | A1 | 8/2008 | El Ouair et al. | WO | WO 00/54075 | 9/2000 |
| 2008/0221795 | A1 | 9/2008 | Amundsen et al. | WO | WO 00/63718 | 10/2000 |
| 2009/0134877 | A1 | 5/2009 | Schaug-Pettersen | WO | WO 01/20366 | 3/2001 |
| 2009/0195251 | A1 * | 8/2009 | Darnet et al. ................ 324/334 | WO | WO 01/33481 | 5/2001 |
| 2009/0243617 | A1 * | 10/2009 | Farrelly et al. ................ 324/337 | WO | WO 01/42818 | 6/2001 |
| 2009/0265111 | A1 | 10/2009 | Helwig et al. | WO | WO 01/55749 | 8/2001 |
| 2009/0267608 | A1 | 10/2009 | Johnstad et al. | WO | WO 01/57555 | 8/2001 |
| 2009/0271118 | A1 | 10/2009 | Saltzer et al. | WO | WO 02/14906 | 2/2002 |
| 2010/0045295 | A1 | 2/2010 | Mittet et al. | WO | WO 03/034096 | 4/2003 |
| 2010/0057363 | A1 | 3/2010 | Amundsen | WO | WO 03/036331 | 5/2003 |
| 2010/0061187 | A1 * | 3/2010 | Sodal ............................ 367/131 | WO | WO 03/042718 | 5/2003 |
| | | | | WO | WO 03/048737 | 6/2003 |
| | | FOREIGN PATENT DOCUMENTS | | WO | WO 03-048812 | 6/2003 |
| EP | | 0215695 | 3/1987 | WO | WO 03/048812 | 6/2003 |
| EP | | 0 219 234 | 4/1987 | WO | WO 03/100467 | 12/2003 |
| EP | | 0368762 | 5/1990 | WO | WO 03/104844 | 12/2003 |
| EP | | 0481886 | 4/1992 | WO | WO 2004/053528 | 6/2004 |
| EP | | 0 512 756 | 11/1992 | WO | WO 2007/018810 | 2/2007 |
| EP | | 0568612 | 3/1996 | | | |
| EP | | 1094338 | 4/2001 | | | |
| EP | | 1253437 | 10/2002 | | OTHER PUBLICATIONS | |
| EP | | 1253443 | 10/2002 | | | |
| EP | | 1255126 | 11/2002 | | | |
| EP | | 1512033 | 12/2003 | | | |
| EP | | 1 309 887 | 3/2004 | | | |
| EP | | 1 256 019 | 6/2004 | | | |
| EP | | 0 814 349 | 11/2006 | | | |
| FR | | 2 479 992 | 10/1981 | | | |
| FR | | 2586302 | 2/1987 | | | |
| GB | | 188676 | 12/1922 | | | |
| GB | | 1342475 | 1/1974 | | | |

Eidesmo et al., "*Sea Bed Logging (SBL), a new method for remote and direct identification of hydrocarbon filled layers in deepwater areas*", 20 First Break (Mar. 2002).

Kaufman et al., "*EM Field of an Electric Dipole on the Surface of a Medium Containing a Thin Resistant Layer*", Frequency and Transient Soundings, publ. Elsevier, (1983).

Kaufman et al., *1981 Annual Meeting Abstracts: Marine EM Prospecting System*, 47 Geophysics 431 (1982).

Cheesman et al., "On the theory of sea-floor conductivity mapping using transient electromagnetic systems", Geophysics, vol. 52, No. 2, Feb. 1987, pp. 204-217.

Garg et al., "Synthetic Electric Sounding Surveys Over Known Oil Fields", 49 Geophysics 1959-67 (Nov. 1984).

Yuan et al., "The Assessment of Marine Gas Hydrates Through Electrical Remote Sounding: Hydrate Without a BSR?"; vol. 27; pp. 2397-2400; Geophys. Res. Letts. 204-217 (Aug. 15, 2000).

Edwards, "On the Resource evaluation of Marine Gas Hydrate Deposits Using Sea-Floor Transient Electric Dipole-Dipole Methods", 62 Geophysics 63-74 (Jan. 1997).

Chave et al., "Some Comments on Seabed Propagation of ULF/ELF Electromagnetic Fields", 25 Radio Science 825-36 (Sep. 1990).

MacGregor et al., "Use of Marine Controlled-Source Electromagnetic Sounding for Sub-Basalt Exploration", 48 Geophys. Prosp. 1091-1106 (Apr. 2000).

MacGregor et al., "Marine Controlled Source Electromagnetic Sounding: Development of a Regularized Inversion for 2-Dimensional Resistivity Structures", 1 LITHOS Science Report 103-109 (Apr. 1999).

MacGregor et al., "The RAMESSES Experiment—III. Controlled-Source Electromagnetic Sounding of the Reykjanes Ridge", 135 Geophys. J. Int. 773-89 (Jul. 1998).

Sinah et al., "Magmatic Processes at Slow Spreading Ridges: Implications of the RAMESSES Experiment at 57 deg. 45'N on the Mid-Atlantic Ridge," 135 Geophys. J. Int. 731-45 (Jul. 1998).

Sinah et al., "Evidence for Accumulated Melt Beneath the Slow-Spreading Mid-Atlantic Ridge," 355 Phil. Trans. R. Soc. Lond. A 233-53 (Jan. 1997).

Constable et al.; Marine Magnetotellurics fro Petroleum Exploration; Part 1: A Sea-Floor Equipment System; Geophysics 63(3); pp. 816-825; May-Jun. 1998.

Hoversten et al.; Maring Magnetotellurics for Petroleum Exploration—Part II; Numerical Analysis of Subsalt Resolution; Geophysics 63(3); pp. 826-940; May-Jun. 1998.

Barton et al, LITHOS Cambridge Advanced Lithological Imaging Project Phase 1: 1998-2001 Sub-Basalt Imaging, 1997.

Chave & Cox, Controlled Electromagnetic Sources for Measuring Electrical Conductivity Beneath The Oceans 1. Forward problem and Model Study, J. Geophysical Research, vol. 87, No. B7, pp. 5327 to 5338, Jul. 10, 1982.

Young & Cox, Electromagnetic Active Source near the East-Pacific Rise, Geophysical Research Letters, vol. 8, No. 10, pp. 1043-1046, Oct. 1981.

Sinha et al, An active source electromagnetic sounding system for marine use, Marine Geophysical Researches, 12:69-68, 1990.

Evans et al, Upper crustal resistivity structure of the East-Pacific Rise near 13 degrees North, Geophysical Research Letters, vol. 18, No. 10, pp. 1917-1920, Oct. 1991.

Evans et al, On the electrical nature of the axial melt zone at 13 degrees North on the East Pacific Rise, Journal of Geophysical Research, vol. 99, No. B1, pp. 577-588, Jan. 1994.

Evans; Constraints on the Large-Scale Porosity and Permeability Sructure of Young Oceanic Crust from Velocity and Resistivity Data, Geophysical Journal International, vol. 119; pp. 869-879; 1994.

Unsworth; Insight into Induction; Chapter 5 in Electromagnetic Exploration of the Oceanic Crust with Controlled-Sources, PhD Thesis; University of Cambridge; 1991.

Edwards; "On the Resource Evaluation of Marine Gas Hydrate Deposits Using Sea-Floor Transient Electric Dipole-Dipole Methods"; 62 Geophysics 63-74; (Jan. 1997).

Barton et al.; LITHOS Cambridge Advanced Lithological Imaging Project Phase 1: 1998-2001 Sub-Basalt Imaging; 1997.

Explorations; Scripps Institute of Oceanography; vol. 4, No. 2; 1997.

Sinha et al.; Sub-Sea-Floor Imaging for Structural and Lithological Properties Using Controlled Source Electromagnetic (CSEM) Sounding, Abstract for Technology for Deep-Sea Geological Investigations: Developments, Applications and Results; Nov. 11-12, 1998.

Sinha & MacGregor; Use of Marine Controlled-Source Electromagnetic Sounding for Sub-Basalt Exploration; Geophysical Prospecting; vol. 48, pp. 1091-1106; 2000.

Sinha; Controlled Source EM Sounding: Survey Design Considerations for Hydrocarbon Applications; LITHOS Science Report; vol. 1, pp. 95 to 101; Apr. 1999.

Spies; Recent Developments in the Use of Surface Electrical Methods for Oil and Gas Exploration in the Soviet Union; Geophysics; vol. 48(8), pp. 1102-1112; 1983.

Garg, N.R. et al. "Synthetic Electric Sounding Surveys Over Known Oil Fields." Geophysics. 49.11 (1984): 1959-1967.

Nekut and Spies, Petroleum Exploration Using Controlled Source Electromagnetic, Methods and Proceedings of the IEEE; vol. 77(2), pp. 338-362, 1989.

Greaves et al, New dimensions in Geophysics for Reservoir Monitoring: SPE Formation Evaluation, Paper SPE 20170, pp. 141-150; Jun. 1991.

Strack & Vozoff, Integrating Long-Offset Transient Electromagnetics (LOTEM) with Seismics in an Exploration Environment, Geophysical Prospecting; vol. 44, pp. 997-1017, 1996.

Edwards & Yuan; The Assessment of Marine Gas Hydrates Through Electrical Remote Sounding: Hydrate without a BSR?; Geophysical Research Letters; vol. 27, No. 16, pp. 2397-2400; Aug. 15, 2000.

Hordt et al, A First Attempt At Monitoring Underground Gas Storage by Means of Time-Lapse Multichannel Transient Electromagnetics. Geophysical Prospecting; vol. 48(3), pp. 489-509, 2000.

Unsworth et al; Electromagnetic Induction by a Finite Electric Dipole Source Over A 2-D Earth, Geophysics; vol. 58, pp. 198-214; 1993.

Flosadottir & Constable, Marine Controlled-Source Electromagnetic Sounding 1; Modelling and Experimental Design, Journal of Geophysical Research; vol. 101, No. B3, pp. 5507 to 5517; Mar. 10, 1996.

Yuan et al.; Electromagnetic Assessment of Offshore Methane Hydrate Deposits on the Cascadia Margin, GP22A-08; American Geophysical Union Fall Meeting, San Francisco; 1998.

Edwards et al.; Electromagnetic Assessment of Offshore Methane Hydrate Deposits on the Cascadia Margin, MARELEC 99, 1999.

MacGregor & Sinha; Marine Controlled Source Electromagnetism: Effect of Source-Receiver Geometry on the Response of 1-D Models; 1996.

MacGregor, et al. "Electrical Resistivity Structure of the Valu Fa Ridge, Lau Basin, from Marine Controlled-Source Electromagnetic Sounding." Geophysical Journal International. 146.1 (2001): 217-236.

LITHOS Cambridge Advanced Lithological Imaging Project; Aug. 21, 1997.

MacGregor et al; Use of Marine Controlled Source Electromagnetic Sounding for Sub-Basalt Exploration; EAGE 61st Conference and Technical Exhibition; 48 Geophys. Prosp.; Apr. 2008; Helsinki, Finland; Jun. 1999.

Constable & Cox, Marine Controlled Source Electromagnetic Sounding 2. The PEGASUS Experiment; Journal of Geophysical Research; vol. 101, No. B3, pp. 5519-5530; Mar. 10, 1996.

Brevik, "Rock model based inversion of saturation and pressure changes from time lapse seismic data," SEG 1999 Expanded Abstracts (4 pgs.).

Das.,"Apparent resistivity curves in controlled-source electromagnetic sounding directly reflecting true resistivities in a layered earth" vol. 60, No. 1, pp. 53-60 (Jan.-Feb. 1995).

Eidesmo et al., "Remote detection of hydrocarbon filled layers using marine controlled source electromagnetic sounding," EAGE 64th Conference & Exhibition—Florence, Italy, 4 pages, May 27-30, 2002.

Ellingsrud et al., "Remote sensing of hydrocarbon layers by seabed logging (SBL): Results from a cruise offshore Angola," The Leading Edge, pp. 972-982, Oct. 2002.

GB Search Report—GB 0119245.9 dated May 28, 2002.

Greer et al., "Remote mapping of hydrocarbon extent using marine Active Source EM Sounding," EAGE 65th Conference & Exhibition—Stavanger, Norway, 4 pages, Jun. 2-5, 2003.

International Search Report—PCT/EP2008/050200 dated Nov. 24, 2008.

International Search Report PCT/EP2005/051480 dated Aug. 24, 2005 and Search Report 0407699.8 dated Sep. 9, 2004.

International Search Report dated Mar. 28, 2003 and International Preliminary Examination Report for PCT/GB02/05355 dated Dec. 9, 2003.
International Search Report for PCT/2007/003484 dated Aug. 1, 2005 and Search Report for GB 0618238.0 dated Jan. 8, 2007.
International Search Report for PCT/EP2005/051483 dated Jul. 28, 2005 and GB 0407697.2 dated Sep. 14, 2004.
International Search Report for PCT/EP2005/051484 dated Aug. 1, 2005 and Search Report from GB 0407696.4 dated Sep. 9, 2004.
International Search Report for PCT/GB2004/003267 dated Oct. 13, 2004 and Search Report for GB0317649.2 dated May 21, 2004.
International Search Report for PCT/GB2004/050044 dated Jul. 29, 2005 and Search Report GB0400423.0 dated May 21, 2004.
International Search Report for PCT/GB2005/000282dated Mar. 14, 2006 and GB 0502064.9 dated May 24, 2005.
International Search Report for PCT/GB2005/004626 dated Feb. 3, 2006 and GB 0426505.4 dated Apr. 6, 2005.
International Search Report for PCT/GB2007/003464 dated Apr. 17, 2008 and Search Reports for GB 0618240.6 dated Jan. 22, 2007 and Mar. 2, 2007.
International Search Report for PCT/GB2007/003880 dated Dec. 9, 2008 and Search Reports for GB 0620328.5 dated May 18, 2007 and Jan. 26, 2007.
International Search Report PCT/EP2005/052781 dated Aug. 30, 2005 and Search Reports GB0414373.1 dated Oct. 14, 2004.
ISR dated Mar. 5, 2009, Written Opinion, Preliminary Report on Patentability for PCT/GB2007/002138 and Search Report GB 0611497.9 dated Oct. 17, 2007.
Kaufman et al., "Marine Electromagnetic Prosepecting System", 1981 Annual Meeting. Abstracts. 1 page.
MacGregor, "Joint analysis of marine active and passive source EM data for sub-salt or sub-basalt imaging," EAGE 65$^{th}$ Conference & Exhibition—Stavanger, Norway, 4 pages, Jun. 2-5, 2003.
Minkoff et al., "Reservoir characterization via time-lapse prestack seismic inversion," 1998 SEG Expanded Abstracts (4 pgs.).
Mittet, R., et al., "Inversion of SBL data acquired in shallow waters," paper presented at EAGE 66th Conference & Exhibition, 5 pgs., (Jun. 6-10, 2004).
Mittet, Rune, et al., On the orientation and absolute phase of marine CSEM receivers, Geophysics, vol. 72 No. 4 pp. F145-F155 (Jul.-Aug. 2007).
Nekut et al., "Petroleum Exploration Using Controlled Source Electromagnetic, Methods", Proceedings of the IEEE, vol. 77(2), pp. 338-362, 1989.
Opderbecke, At-Sea Calibration of a USBL Underwater Vehicle Positioning System, Oceans 97 Conference Proceedings Halifax, NS, Canada, MTS/IEEE vol. 1 pp. 721-726 (Oct. 1997).
Osen et al., Removal of water-layer multiples from multicomponenet sea-bottom data. Geophysics. vol. 64, No. 3. pp. 838-851. May-Jun. 1999.
Peyronnet et al., "POSIDONIA 6000: A New Long Range Highly Accurate Ultra Short Base Line Positioning System" Oceans 98 Conference Proceedings, Nice, France IEEE, vol. 3, pp. 1721-1727 (Sep. 1998).
Preliminary Examination Report—PCT/GB01/03473 mailed Apr. 24, 2002.
Preliminary Examination Report—PCT/GB99/02823 dated Dec. 5, 2000.
Preliminary Examination Report—PCT/GB00/04667 dated Jan. 29, 2002.
Preliminary Examination Report—PCT/GB99/03039 dated Oct. 10, 2000.
Rosten et al., (2003) A Seabed Logging Calibration Survey over the Ormen Lange Gas Field, EAGE, 65th An. Intern. Mtg. Eur.Assoc. Geosc.Eng.Extended Abstracts P058.
Rutledal et al., "Time-Lapse Elastic Inversion at the Oseberg Field," EAGE 64$^{th}$ Conference & Exhibition—Florence Italy May 27-30, 2002 (4 pgs.).
Sinha et al., "*Evidence for Accumulated Melt Beneath the Slow-Spreading Mid-Atlantic Ridge*," 355 Phil. Trans. R. Soc. Lond. A 233-53 (Jan. 1997).
Sinha et al., "An Active Source Electromagnetic Sounding System for Marine Use", Marine Geophysical Researches, 12:59-68, 1990.

Sinha et al., "*Magmatic Processes at Slow Spreading Ridges: Implications of the RAMESSES Experiment at 57 deg. 45'N on the Mid-Atlantic Ridge*," 135 Geophys. J. Int. 731-45 (Jul. 1998).
Slob, "Wave field decomposition of full-polarimetric data based on the two-way wave equation," Grounds Penetrating Radar, Proceedings of the 10$^{th}$ Int'l Conference on Delft, The Netherlands, Jun. 21-24, 2004, vol. 1 pp. 315-318 (Jun. 21, 2004).
Unsworth et al., "Electromagnetic Induction by a Finite Electric Dipole Source Over a 2-D Earth", Geophysics, vol. 58, pp. 198-214, 1993.
Ursin, "Review of elastic and electomagnetic wave propagation in horizontally layered media" Geophysics. vol. 48, No. 8. pp. 1063-1081. Aug. 1983.
Varela et al., "Assessing dynamic reservoir behavior with time-lapse pre-stack 3D seismic data: a sensitivity study based on inversion," EAGE 64$^{th}$ Conference & Exhibition—Florence Italy May 27-30, 2002 (4 pgs.).
Application and File History of U.S. Publication No. 2009/0134877, published May 28, 2009, inventor Schaug-Pettersen.
Application and File History of U.S. Patent No. 7,126,338, issued Oct. 24, 2006, inventor Eidesmo.
Application and File History of U.S. Publication No. 2007/0150201, published Jun. 28, 2007, inventor Eidesmo.
Application and File History of U.S. Patent No. 6,859,038, issued Feb. 22, 2005, inventor Ellingsrud.
Application and File History of U.S. Patent No. 7,145,341, issued Dec. 5, 2006, inventor Ellingsrud.
Application and File History of U.S. Patent No. 6,628,119, issued Sep. 30, 2003, inventor Eidesmo.
Application and File History of U.S. Patent No. 7,026,819, issued Apr. 11, 2006, inventor Eidesmo.
Application and File History of U.S. Appl. No. 11/287,893, filed Nov. 28, 2005, inventor Eidesmo.
Application and File History of U.S. Patent No. 6,696,839, issued Feb. 24, 2004, inventor Ellingsrud.
Application and File History of U.S. Patent No. 6,864,684, issued Mar. 8, 2005, inventor Ellingsrud.
Application and File History of U.S. Appl. No. 11/585,992, filed Oct. 24, 2006, inventor Ellingsrud.
Application and File History of U.S. Appl. No. 11/585,991, filed Oct. 24, 2006, inventor Ellingsrud.
Application and File History of U.S. Patent No. 6,717,411, issued Apr. 6, 2004, inventor Ellingsrud.
Application and File History of U.S. Patent No. 6,900,639, issued May 31, 2005, inventor Ellingsrud.
Application and File History of U.S. Patent No. 7,038,456, issued May 2, 2006. inventor Ellingsrud.
Application and File History of U.S. Patent No. 7,202,669, issued Apr. 10, 2007, inventor Ellingsrud.
Application and File History of U.S. Patent No. 7,423,432, issued Sep. 9, 2008, inventor Amundsen.
Application and File Histroy of U.S. Patent No. 7,319,330, issued Jan. 15, 2008, inventor Ellingsrud.
Application and File History of U.S. Publication No. 2006/0202697, published Sep. 14, 2006, inventor Sodal.
Application and File History of U.S. Publication No. 2008/0122444, published May 29, 2008, inventor Schaug-Pettersen.
Application and File History of U.S. Appl. No. 12/304,073, filed Mar. 10, 2009, inventor Ellingsrud.
Application and File History of U.S. Appl. No. 12/441,632, filed Sep. 24, 2009, inventor Mittet.
Application and File History of U.S. Publication No. 2010/0045295, published Feb. 25, 2010, inventor Mittet.
Application and File History of U.S. Appl. No. 12/443,189, filed Dec. 30, 2009, inventor Ridyard.
Application and File History of U.S. Publication No. 2010/0061187, published Mar. 11, 2010, inventor Sodal.
U.S. Appl. No. 61/298,582, filed Jan. 27, 2010, inventor Perryman.
Application and File History of U.S. Patent No. 6,834,732, issued Dec. 28, 2004, inventor Haarstad.
Application and File History of U.S. Patent No. 7,149,672, issued Dec. 12, 2006, inventor Torkildsen.

Application and File History of U.S. Publication No. 2008/0195358, published Aug. 14, 2008, inventor El Ouair.

Application and File History of U.S. Publication No. 2008/0065330, published Mar. 13, 2008, inventor Rosten.

Application and File History of U.S. Publication No. 2008/0221795. Sep. 11, 2008, inventor Amundsen.

Application and File History of U.S. Publication No. 2010/0057363, published Mar. 4, 2010, inventor Amundsen.

Greaves et al., New Dimensions of Geophysics for Reservoir Monitoring, pp. 141-150. Jun. 1991.

"Applications of 3-Dimensional Electromagnetic Induction by Sources in the Ocean", A proposal submitted to MAST III under Area C: Marine Technology, Part 1. Oct. 1996.

"Applications of 3-Dimensional Electromagnetic Induction by Sources in the Ocean", A proposal submitted to MAST III under Area C: Marine Technology, Part 2. Oct. 1996.

MacGregor et al., "Electromagnetic Evidence for a Crustal Melt Accumulation Beneath the Slow Spreading Reykjanes Ridge", Abstract for 13th Workshop on EM Induction in the Earth. 1996.

MacGregor, "Electromagnetic Investigation of the Reykjanes Ridge Near 58° North", PhD Thesis, University of Cambridge. Jan. 1997.

* cited by examiner

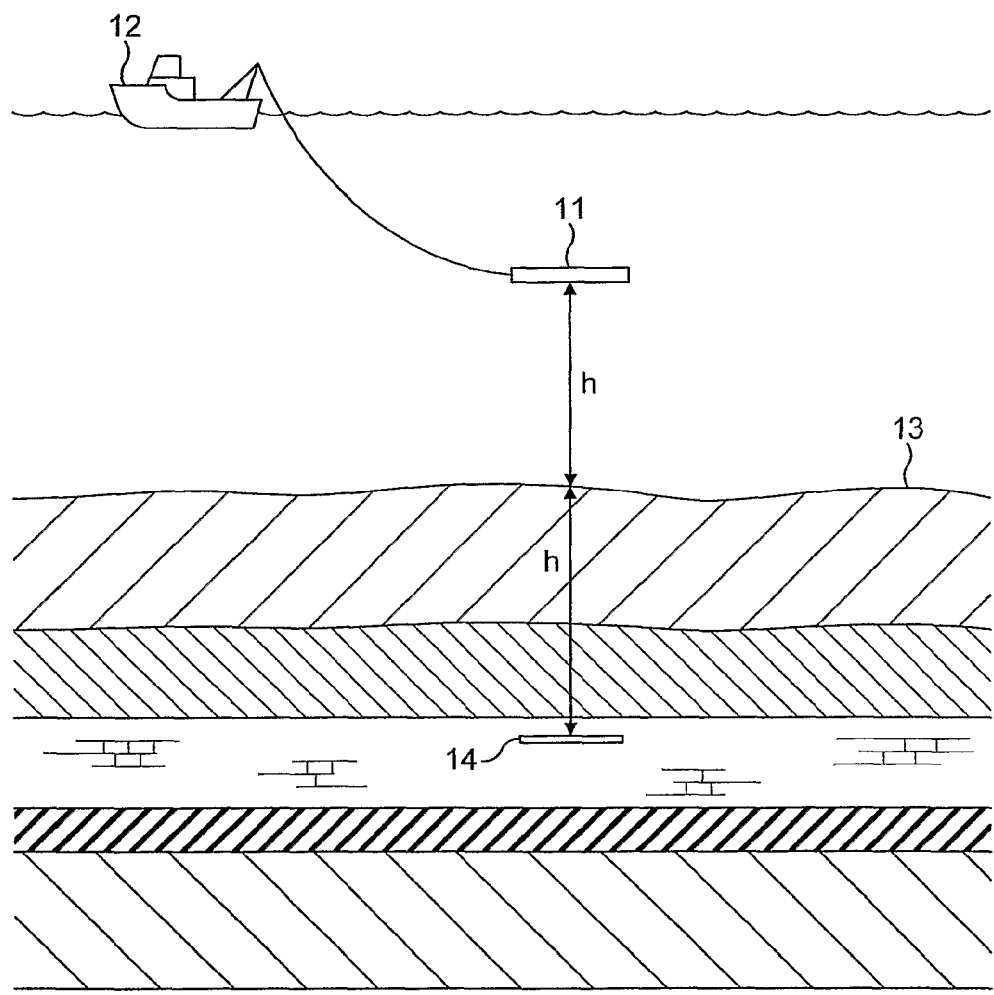

ELECTROMAGNETIC SURVEYING

RELATED APPLICATIONS

This application claims priority to PCT Application No. PCT/GB2007000459, filed Feb. 9, 2007, and Great Britain Application No. 0602656.1 filed Feb. 9, 2006, the disclosures of which are hereby incorporated herein by reference in their entirety.

TECHNICAL FIELD

The present invention relates to electromagnetic (EM) surveying, in particular for seabed logging, and is concerned with providing a system for determining the resistivity or conductivity of subsea strata, especially the upper strata, e.g. at a depth of up to about 100 m or even greater.

BACKGROUND ART

Currently, the most widely used techniques for geological surveying, particularly in sub-marine situations, are seismic methods. These seismic techniques are capable of revealing the structure of the subterranean strata with some accuracy. However, whereas a seismic survey can reveal the location and shape of a potential reservoir, it can normally not reveal the nature of the reservoir.

It has been appreciated by the present applicants that while the seismic properties of hydrocarbon filled strata and water-filled strata do not differ significantly, their electromagnetic resistivities do differ. Thus, by using an electromagnetic surveying method, these differences can be exploited and the success rate in predicting the nature of a reservoir can be increased significantly.

Consequently, a method and apparatus embodying these principals form the basis of the present applicants' European Patent EP-A-1256019.

This contemplates a method for searching for a hydrocarbon containing subterranean reservoir which comprises: applying a time varying electromagnetic field to subterranean strata; detecting the electromagnetic wave field response; seeking, in the wave field response, a component representing a refracted or ducted wave; and determining the presence and/or nature of any reservoir identified based on the presence or absence of a wave component refracted or ducted by hydrocarbon layer.

A ducted wave behaves differently, depending on the nature of the stratum in which it is propagated. In particular, the propagation losses in hydrocarbon stratum are much lower than in a water-bearing stratum while the speed of propagation is much higher. Thus, when a hydrocarbon-bearing reservoir is present, and an EM field is applied, a strong and rapidly propagated ducted wave can be detected. This may therefore indicate the presence of the reservoir or its nature if its presence is already known.

Electromagnetic surveying techniques in themselves are known. However, they are not widely used in practice. In general, the reservoirs of interest are about 1 km or more below the seabed. In order to carry out electromagnetic surveying as a stand alone technique in these conditions, with any reasonable degree of resolution, short wavelengths are necessary. Unfortunately, such short wavelengths suffer from very high attenuation. Long wavelengths do not provide adequate resolution. For these reasons, seismic techniques are preferred.

However, while longer wavelengths applied by electromagnetic techniques cannot provide sufficient information to produce an accurate indication of the boundaries of the various strata, if the geological structure is already known, they can be used to determine the nature of a particular identified formation, if the possibilities for the nature of that formation have significantly differing electromagnetic characteristics. The resolution is not particularly important and so longer wavelengths which do not suffer from excessive attenuation can be employed.

The resistivity of seawater is about 0.3 ohm-m and that of the overburden beneath the seabed would typically be from 0.3 to 4 ohm-m, for example about 2 ohm-m. However, the resistivity of an oil reservoir is likely to be about 20-300 ohm-m. This large difference can be exploited using EM surveying techniques. Typically, the resistivity of a hydrocarbon-bearing formation will be 20 to 300 times greater than water-bearing formation.

Thus, an EM source such as an electric dipole transmitter antenna on or close to the sea floor induces (EM) fields and currents in the sea water and in the subsurface strata. In the sea water, the EM-fields are strongly attenuated due to the high conductivity in the saline environment, whereas the subsurface strata with less conductivity potentially can act as a guide for the EM-fields (less attenuation). If the frequency is low enough (in the order of 1 Hz), the EM-waves are able to penetrate deep into the subsurface, and deeply buried geological layers having higher electrical resistivity than the overburden (as e.g. a hydrocarbon filled reservoir) will affect the EM-waves. Depending on the angle of incidence and state of polarisation, an EM wave incident upon a high resistive layer may excite a ducted (guided) wave mode in the layer. The ducted mode is propagated laterally along the layer and leaks energy back to the overburden and receivers positioned on the sea floor. The terms "refracted" and "ducted" are used in this specification to refer to this wave mode.

In seabed logging, a signal is emitted from a towed source antenna, parallel to, and close to the sea floor; and the wavefield response detected by a number of stationary receivers, distributed on the sea floor, is recorded. The strength of the emitted signal is proportional to the current $I_A$ delivered to the antenna, and this current is accurately monitored and recorded. [If the current source is very stable, the current would, of course be constant.]

SUMMARY OF THE INVENTION

It is an object of the present invention to provide an apparatus and method for detecting and/or determining the nature of a subterranean reservoir.

According to one aspect of the invention, there is provided a method of determining the nature of a subterranean stratum which comprises: deploying an electric dipole transmitter antenna, preferably with its axis generally horizontal; applying an electromagnetic (EM) field to the stratum containing the reservoir using the transmitter; measuring the current and voltage at the antenna terminals during the EM transmission; and determining the nature of the stratum from changes in the measured voltage.

Changes in the nature of subterranean strata cause changes in the resistivity of the seabed as a whole beneath the sea floor. Since the resistivity of the source, antenna and sea water should remain constant, these changes in seabed resistivity alone may cause the voltage at the antenna terminals to vary and so the variations in antenna voltage will be representative of the of the changes in the nature of the strata in the seabed.

Thus, analysis of the logged receiver data may reveal the presence of a fast, low attenuation guided wave, and thus the presence of a high resistivity stratum which may be oil bearing.

High resistivity may, however, occur, not in oil bearing strata only, but also in strata consisting of e.g. solid salt or rock containing little or no water. In order to determine the nature of the high resistivity stratum, it is generally necessary to carry out a detailed analysis of the logged receiver data, in order to create a model, based on the seismic data, in which resistivity values are assigned to the various strata. From the geological knowledge of the region in question, the most likely nature of a high resistivity stratum may then be ascertained.

The accuracy of the model is limited by the receiver data, and may be improved by utilising other available information. One means of obtaining such additional information is by monitoring the input impedance of the towed transmitter antenna $Z_A = V_A/I_A$, where $I_A$ is the antenna current and $I_A$ the terminal voltage.

The input impedance of the towed transmitter antenna is determined by the following parameters:
1. The configuration of the antenna.
2. The conductivity of the sea water
3. The position and orientation of the antenna with respect to the sea floor
4. The topography of the sea floor (plane or otherwise).
5. The resistivity distribution below the sea floor.

Parameters 1-4 may be separately monitored and accounted for, and the remaining variations of $Z_A$ provide information about the resistivity distribution below the sea floor.

In one embodiment, the transmitter is located on or close to the seabed or the bed of some other area of water. Preferably, the frequency of the EM field is continuously varied over the transmission period. Preferably, the field is transmitted for a period of time for 3 seconds to 60 minutes, for example, from 10 seconds to 5 minutes. Preferably, the method is repeated at different locations.

In a more preferred embodiment, the transmitter is towed over the seabed while the EM field is being transmitted. The transmitter is preferably towed as close to the sea floor as possible. Preferably, the distance to the sea floor should be much less than the length of the antenna (e.g. 20 m to 200 m), and much less than the wavelength of the frequencies to be used.

Preferably, the transmitter includes an inertia sensor to sense the difference between a change in the sea floor height and a rise/fall of the transmitter.

In addition, the transmitted signal shape may be modified so that it contains more of the harmonics which are useful for mapping the conductivity. It will be understood that calculation of the conductivity of the upper strata of the seabed as a function of position and depth is also desirable.

Preferably, the method of the invention is carried out during a conventional EM survey using receivers to detect the transmission wavefield response. The method may also be used in conjunction with seismic surveying techniques.

The invention extends to a method for detecting different subterranean strata and is particularly applicable to the detection and identification of hydrocarbon bearing strata.

Preferably, the wavelength of the transmission is given by the formula $0.01h \leq \lambda \leq 30h$; or more preferably, $0.1h \leq \lambda \leq 10h$ wherein $\lambda$ is the wavelength of the transmission through the subsea strata and h is the distance from the seabed to the strata under investigation. Preferably, the transmission frequency is from 0.01 Hz to 1 kHz, for example, from 0.1 to 20 Hz.

The invention extends to a process for the production of a survey report by carrying out a method according to the invention, and a survey report produced in this way.

BRIEF DESCRIPTION OF THE DRAWINGS

The invention may be carried into practice in various ways and an embodiment will now be described by way of example with reference to the accompanying drawings, in which:

FIG. 1 is a schematic diagram depictive how the invention may be carried out in practice.

DETAILED DESCRIPTION OF THE DRAWINGS

FIG. 1 depicts an antenna 11 towed by a vessel 12 at a distance h above the sea floor 13. The antenna 11 emits a wavefield, whose strength is proportional to the current $I_A$ delivered to the antenna 11, and this is accurately monitored and recorded. By also monitoring and recording the voltage $V_A$ at the antenna terminals the impedance of the antenna Z. $V_A/I_A$, may be calculated. $Z_A$ is a function of the frequency, f, and when a multifrequency signal is employed, this function may be found within a range of frequencies extending from f=0 to a maximum frequency $f_{max}$, determined by the frequency spectrum of the signal, and the accuracy of the voltage and current measurements. By means of the impedance function, the following important parameters may be calculated, namely, the distance from the antenna to the sea floor, the conductivity of the sea water, and the step in conductivity at the sea floor, and possibly more detail of the conductivity variation immediately below the sea floor.

Part of the emitted signal is reflected at the sea floor, the reflection coefficient being $$\rho = \frac{\sigma_1 - \sigma_2}{\sigma_1 - \sigma_2} \qquad (1)$$

where $\sigma_1$ and $\sigma_2$ are the conductivities above and below the sea floor 13, respectively. The reflected signal induces a voltage $V_R$ in the antenna, thereby altering the voltage and the current at the antenna terminals, thus ultimately causing a change in the antenna impedance. The amplitude and phase of $V_A$ vary with the frequency f, and the distance h between the antenna and the sea floor. At sufficiently high frequencies, $V_A$ is negligible, and the impedance depends only on the frequency, and on the conductivity $\sigma_1$, which may then be calculated.

Assuming $\sigma_2$ constant, the reflected signal may be found from the simple model indicated in FIG. 1, as emitted from an image antenna 14 located the distance h below the (plane) sea floor, with $\sigma_2 = \sigma_1$. The current of the image antenna is $\rho I_A$.

The invention claimed is:
1. A method of determining the nature of a subterranean stratum which comprises the steps:
   deploying an electric dipole transmitter antenna;
   applying an electromagnetic (EM) field to the stratum using the transmitter;
   measuring the current and voltage at the transmitter antenna terminals during the EM transmission;
   calculating the input impedance of the transmitter antenna from the measured current and voltage;

using changes in the impedance to calculate the resistivity of the stratum; and determining the nature of the stratum from the resistivity.

2. A method according to claim 1, in which the resistivity is combined with existing geological knowledge of the stratum to determine the nature of the stratum.

3. A method according to claim 2, in which the existing geological knowledge comprises seismic data.

4. A method according to claim 1, in which the conductivity of the sea water is monitored and changes in sea water conductivity are taken into account in determining the antenna input impedance.

5. A method according to claim 1, in which the height of the antenna above the sea floor is monitored and changes in the antenna height are taken into account in determining the antenna input impedance.

6. A method according to claim 1, in which the transmitter antenna is deployed with its axis generally horizontal.

7. A method according to claim 1, in which the transmitter is towed over the seabed while the EM field is being transmitted.

8. A method according to claim 1, in which the transmitter is towed at a distance between 20 m and 200 m from the seabed.

9. A method according to claim 1, in which the transmitter is towed at a distance from the seabed which is significantly less than the wave length of the frequencies of the EM transmitter.

10. A method according to claim 1, in which the transmitted signal shape contains harmonics which are used in the determination of the antenna input impedance.

11. A method according to claim 1, in which the wave length of the EM transmitter is given by the formula $0.01h \leq \lambda \leq 30h$, wherein $\lambda$ is the wave length of the transmission through the subsea strata and h is the distance from the seabed to the strata under investigation.

12. A method according to claim 1, in which the transmission frequency is from 0.01 Hz to 1 kHz.

13. A process for the production of a survey report which comprises carrying out a method as claimed in claim 1, and formulating the voltage changes together with the related conclusions into a report.

14. A process for the production of a survey report which comprises carrying out a method as claimed in of claims 1 and formulating the impedance changes together with the related conclusions into a report.

* * * * *